US010547076B2

United States Patent
Ebrahim et al.

(10) Patent No.: US 10,547,076 B2
(45) Date of Patent: Jan. 28, 2020

(54) POROUS SOLID OXIDE FUEL CELL ANODE WITH NANOPOROUS SURFACE AND PROCESS FOR FABRICATION

(71) Applicants: University of Houston System, Houston, TX (US); Rabi Ebrahim, Houston, TX (US); Mukhtar Yeleuov, Houston, TX (US); Alex Ignatiev, Houston, TX (US)

(72) Inventors: Rabi Ebrahim, Houston, TX (US); Mukhtar Yeleuov, Houston, TX (US); Alex Ignatiev, Houston, TX (US)

(73) Assignee: University of Houston System, Houston, TX (US)

( * ) Notice: Subject to any disclaimer, the term of this patent is extended or adjusted under 35 U.S.C. 154(b) by 17 days.

(21) Appl. No.: 15/547,641

(22) PCT Filed: Jan. 29, 2016

(86) PCT No.: PCT/US2016/015671
§ 371 (c)(1),
(2) Date: Jul. 31, 2017

(87) PCT Pub. No.: WO2016/126549
PCT Pub. Date: Aug. 11, 2016

(65) Prior Publication Data
US 2018/0269509 A1   Sep. 20, 2018

Related U.S. Application Data

(60) Provisional application No. 62/110,997, filed on Feb. 2, 2015.

(51) Int. Cl.
*H01M 8/124*   (2016.01)
*H01M 4/86*   (2006.01)
*H01M 4/90*   (2006.01)

(52) U.S. Cl.
CPC ........... *H01M 8/124* (2013.01); *H01M 4/861* (2013.01); *H01M 4/8621* (2013.01);
(Continued)

(58) Field of Classification Search
CPC .... H01M 8/124; H01M 4/8605; H01M 4/861; H01M 4/8621; H01M 4/8657;
(Continued)

(56) References Cited

U.S. PATENT DOCUMENTS 6,869,722 B2   3/2005   Kearl
2007/0072035 A1   3/2007   Korevaar et al.
(Continued)

OTHER PUBLICATIONS

Jul. 6, 2016 PCT Written Opinion and ISR.
Aug. 17, 2017 PCT Preliminary Report on Patentability.

*Primary Examiner* — Stewart A Fraser
(74) *Attorney, Agent, or Firm* — Carter, Deluca & Farrell, LLP; George Likourezos

(57) ABSTRACT

Electrochemical devices including solid oxide fuel cells (SOFCs) or thin film solid oxide fuel cells (TFSOFCs) having a porous metallic anode with nanoporous surface structure enabling the deposition of a dense, impermeable thin film electrolyte layer on the porous anode. Fabricating methods include forming a mixture of nanopowder metallic agents and nanopowder proppant that are sintered, smoothed and etched to form the nanoporous surface structure.

23 Claims, 14 Drawing Sheets

(52) U.S. Cl.
CPC ....... *H01M 4/8657* (2013.01); *H01M 4/9066* (2013.01); *H01M 2004/8684* (2013.01); *H01M 2004/8689* (2013.01); *H01M 2008/1293* (2013.01)

(58) Field of Classification Search
CPC ................. H01M 4/9066; H01M 8/12; H01M 2004/8684; H01M 2004/8609; H01M 2008/1293
See application file for complete search history.

(56) References Cited

U.S. PATENT DOCUMENTS

2007/0237998 A1* 10/2007 Armstrong ........ H01M 8/04089
429/489
2012/0003565 A1 1/2012 Son et al.
2012/0231366 A1 9/2012 Wachsman et al.
2013/0093128 A1 4/2013 Kim et al.

\* cited by examiner

POROUS SOLID OXIDE FUEL CELL ANODE WITH NANOPOROUS SURFACE AND PROCESS FOR FABRICATION

RELATED APPLICATIONS

This application is a 35 U.S.C. § 371 national phase filing PCT Serial No. PCT/US16/15671 filed 29 Jan. 2017, which claims priority to and the benefit of U.S. Provisional Patent Application Ser. No. 62/110,997 filed Feb. 2, 2015 (2 Feb. 2015).

BACKGROUND OF THE INVENTION

1. Field of the Invention

Embodiments of the present invention relate to electrochemical apparatuses including solid oxide fuel cells (SOFCs) and methods for making and using same.

More particularly, embodiments of the present invention relate to electrochemical apparatuses including SOFCs, where the SOFCs include thin film solid oxide fuel cells (TFSOFCs) including a porous metallic anode having a nano-porous surface structure and a micro-porous internal structure enabling deposition of a dense, impermeable, thin film, electrolyte layer on the porous anode surface, while maintaining anodic function. The present invention also relates to methods for making and using same.

2. Description of the Related Art

Fuel cells are energy-conversion devices that use an oxidizer (e.g., oxygen or air) to convert chemical energy in a fuel (e.g., hydrogen or low molecular weight hydrocarbons) into electrical energy. A solid oxide fuel cell (SOFC) generally comprises a solid electrolyte layer with an oxidizer electrode (cathode) on one side of the electrolyte and a fuel electrode (anode) on the other side. The electrodes are required to be porous, or at least permeable to the oxidizer at the cathode and the fuel at the anode, while the electrolyte layer is required to be dense so as to prevent leakage of gas across the layer. A thin film solid-oxide fuel cell (TFSOFC) has a thin electrolyte layer, on the order of 0.1 micrometers or microns ($\mu$ or $\mu$m) to 5 $\mu$m thick, as described, for example, in U.S. Pat. No. 6,645,656. The use of a thin electrolyte layer reduces the operating temperature significantly. A significant reduction in operating temperature increases the reliability of the fuel cell, and allows wider choices of materials for TFSOFC applications. Using the TFSOFC design may also reduce materials costs and reduce the volume and mass of the fuel cell for a given power output.

U.S. Pat. No. 6,645,656 discloses physical and chemical deposition techniques to synthesize basic components of a TFSOFC consisting of an electrolyte thin film, e.g., yttria stabilized zirconia (although a number of other oxide electrolytes could be utilized), a thin film cathode layer, e.g., lanthanum, strontium cobalt oxide (although a number of other oxide cathodes could be utilized) both deposited on a porous metal anode, e.g., nickel (although a number of other metal anodes could be utilized).

Thin film oxide deposition technologies such as pulsed laser deposition (PLD) or metal organic chemical vapor deposition (MOCVD) can be used for the deposition of the oxide electrolyte as well as for the conducting oxide cathode layer. PLD is an ideal vehicle to develop very thin films for TFSOFC applications, while MOCVD is good for large area thin film fabrication. Sputtering, evaporation, sol-gel, metal organic deposition (MOD), electron beam evaporation, chemical vapor deposition (CVD), molecular beam epitaxy (MBE), or other oxide film deposition techniques can also be used. For an effective thin film electrolyte layer having a thickness between 0.1 $\mu$m and 5 $\mu$m to be deposited onto the porous metal anode, it must be dense and impermeable to gas flow. Hence the deposition of the thin film electrolyte layer onto the anode requires that the surface of the porous metal anode have a pore size that is equal to or less than the thickness of the electrolyte layer, thus allowing for full coverage and closure of the pores. The most common porous metallic-based anode materials for solid oxide fuel cells are nickel (Ni)-cermets prepared by high-temperature calcination of NiO and yttria-stabilized zirconia (YSZ) powders as described in U.S. Pat. Nos. 6,589,680 B1; 7,842,200 B2; in Suzuki et al, "Impact of Anode Microstructure on Solid Oxide Fuel Cells", Science, 325, pp. 852(2009); in Chen et al, "Hierarchically Oriented macroporous anode-supported solid oxide fuel cell with thin ceria electrolyte film", Applied Materials & Interfaces, 6, lop. 5130(2014); in Y. Liu and M. Liu, "Porous SOFC anode prepared by sublimation of an ikmiscible metal oxide during sintering", Electrochem and Solid State Letters, 9, pp. B25 (2006). High-temperature calcination is essential in order to reduce the nickel oxide to metallic nickel and thus form the necessary electronic conductivity and porosity in the anode structure.

While several anode structures and methods for making the anode structures are known, there is still a need in the art for anode structures and methods for manufacturing same, where the porous metallic anode with nano-porous surface structure and micro-porous internal structure enables the deposition of a dense, impermeable thin film electrolyte layer on the porous anode, while maintaining anodic function

SUMMARY OF THE INVENTION

Methods for Making

Embodiments of the present invention provide methods for making porous metal anode films, where the porous metal anode films include surfaces having a surface nanoporous structure and an interior having an internal nanoporous structure. The surface nanoporous structure is characterized in that the structure includes pores having pore sizes equal to or smaller than a thickness of an electrolyte layer deposited of a surface of the porous metal anode film. The internal nanoporous structure is characterized in that the structure includes pores having pore sizes greater than or equal to the pore sizes of the surface nanoporous structure.

Embodiments of this invention provide methods for making solid oxide fuel cell (SOFC) porous anodes including combining a metallic nanopowder and a proppant nanopowder to form a nanopowder mixture. The methods also include pressing the nanopowder mixture at a temperature and pressure and for a pressing time sufficient to form a shape having a least one flat surface. The methods also include heating the shape at an elevated temperature, at a pressure and for a heating time sufficient to form an SOFC anode. The methods may also include cutting the SOFC anode into a SOFC anode film having a given thickness. The methods may also include polishing at least one surface of the SOFC anode or a SOFC anode film to form a smoothed surface SOFC anode. The methods may also include ion etching the smoothed surface of the smoothed surface SOFC anode to from an ion etched, smoothed surface SOFC anode.

Embodiments of the present invention provide methods for making thin film solid oxide fuel cell (TFSOFCs) including a porous metal anode film of this invention, an oxide electrolyte layer deposited on a surface of the porous metal anode film, and a cathode layer deposited on a surface of the electrolyte layer, where the electrolyte layer covers or substantially covers the anode film and has a thickness sufficient to prevent shorting of the TFSOFC.

Anodes, Anode Constructs, and Solid Oxide Fuel Cells

Embodiments of this invention provide solid oxide fuel cell (SOFC) porous anode compositions including a porous interior and a porous surface. The porous surface includes pores having pore sizes between about 10 nm and about 1000 nm (1 μm) and has a surface roughness less than or equal to about 100 nm. The porous interior includes pores having pore sizes between about 10 nm and about 10 μm and the surface.

Embodiments of this invention provide porous anode constructs including an anode layer having a porous interior and a porous surface and an electrolytic layer formed on a thereof, where the electrolytic layer is a continuous, dense, and electrically insulating thin film. The porous surface includes pores having pore sizes between about 10 nm and about 1000 nm (1 μm) and has a surface roughness less than or equal to about 100 nm. The porous interior includes pores having pore sizes between about 10 nm and about 10 μm and the surface. The electrolyte layer has a thickness and coverage of the anode layer sufficient to prevent shorting of a SOFC include an anode construct of this invention.

Embodiments of this invention provide solid oxide fuel cell (SOFC) constructs including an anode layer having a porous interior and a porous surface, an electrolytic layer formed on a thereof, and a cathode layer formed on the electrolytic layer, where the electrolytic layer is a continuous, dense, and electrically insulating thin film sandwiched between the anode layer and the cathode layer. The porous surface includes pores having pore sizes between about 10 nm and about 1000 nm (1 μm) and has a surface roughness less than or equal to about 100 nm. The porous interior includes pores having pore sizes between about 10 nm and about 10 μm and the surface. The electrolyte layer has a thickness and coverage of the anode layer sufficient to prevent shorting of the SOFC.

BRIEF DESCRIPTION OF THE DRAWINGS

The invention can be better understood with reference to the following detailed description together with the appended illustrative drawings in which like elements are numbered the same.

DEFINITIONS OF TERM USED IN THE INVENTION

Figure 1A:
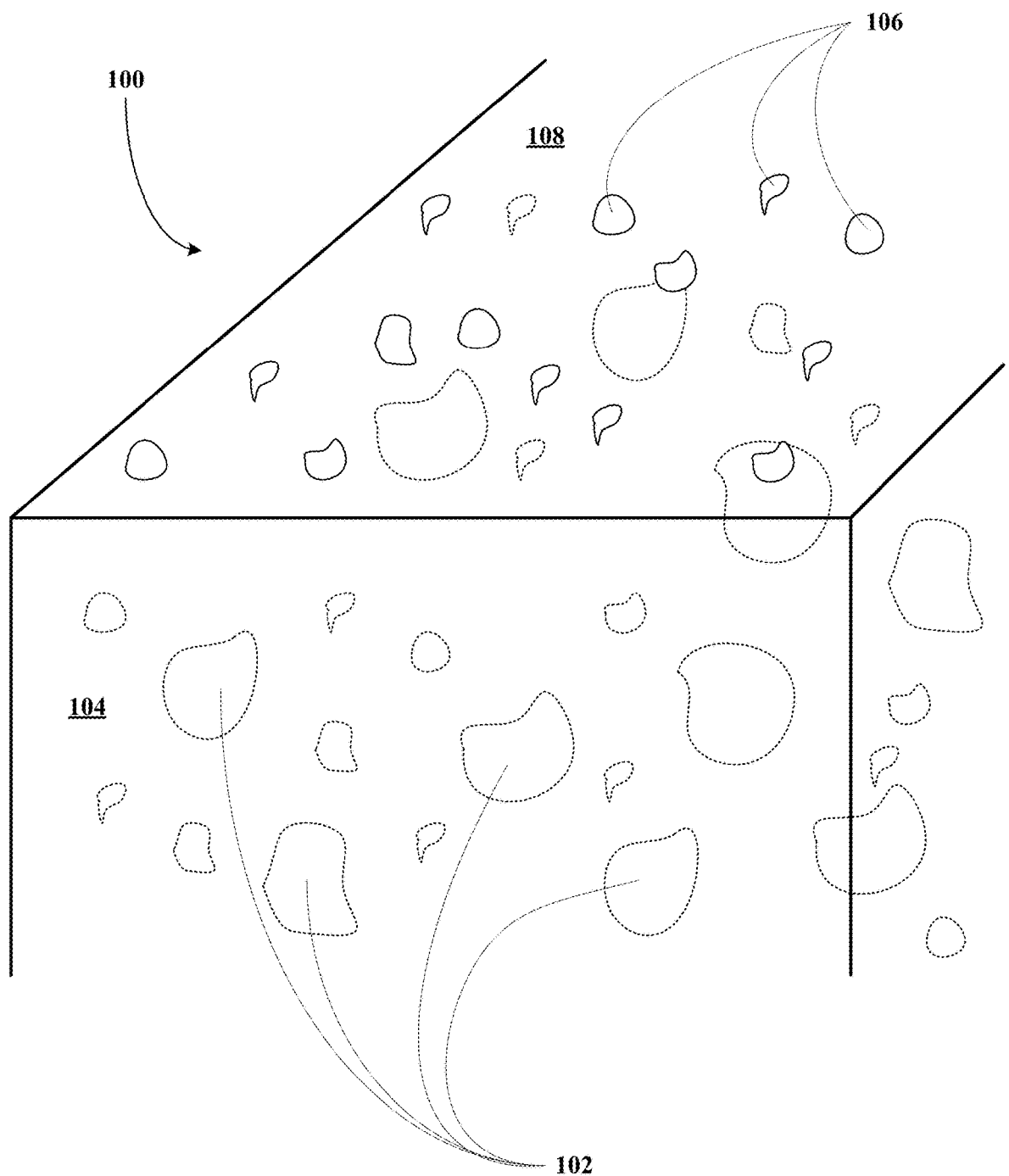
FIG. 1A depicts a schematic representation of a metal anode construct of this invention.

The following definitions are provided in order to aid those skilled in the art in understanding the detailed description of the present invention.

The term "about" means that the value is within about 10% of the indicated value. In certain embodiments, the value is within about 5% of the indicated value. In certain embodiments, the value is within about 2.5% of the indicated value. In certain embodiments, the value is within about 1% of the indicated value. In certain embodiments, the value is within about 0.5% of the indicated value.

The term "substantially" means that the value is within about 5% of the indicated value. In certain embodiments, the value is within about 2.5% of the indicated value. In certain embodiments, the value is within about 1% of the indicated value. In certain embodiments, the value is within about 0.5% of the indicated value. In certain embodiments, the value is within about 0.1% of the indicated value.

The term "SOFC" means a solid oxide fuel cell.

The term "TFSOFC" means a thin film solid oxide fuel cell.

The term "YSZ" means yttria-stabilized zirconia.

The term "CMP" means chemical-mechanical polishing.

The term "sccm" means standard cubic centimeters per minute.

The term "MOCVD" means organic chemical vapor deposition.

The term "MOD" means electron beam evaporation.

The term "CVD" means chemical vapor deposition.

The term "MBE" means molecular beam epitaxy.

DETAILED DESCRIPTION OF THE INVENTION

The inventors have found that new methods or processes for fabricating porous metal anodes having a nanoporous structure at the surface may be implemented, where the methods or processes yield porous metal anode films that are capable of being fully and imperviously covered by a thin film electrolyte layer. These processes permit the fabrication of SOFCs or TFSOFCs including the porous metal anode of this invention covered with a thin electrolyte layer resulting in reduced operating temperatures of the SOFCs or TFSOFCs. The electrolyte layer is dense and pore-free to prevent gas leakage through it and to eliminate shorting of the SOFCs or TFSOFCs between the fuel cell anode and the fuel cell cathode. We have also found that porous electrodes may be used to increase the gas transport rate of the SOFCs or TFSOFCs of this invention. These requirements increase fabrication difficulties of TFSOFCs as the electrolyte layer generally has a thickness between 0.1 μm and 5 μm thick, yet still must totally cover the surface pores of the porous anode to prevent gas leakage and shorting across the electrolyte layer.

Methods for Making SOFC Anodes, Anode Constructs, SOFCs, and TFSOFCs

Anodes

Embodiments of the present invention broadly relates to porous metal anode fabrication processes including mixing a metallic nanopowder and a proppant or pore forming nanopowder to form a nanopowder mixture, where the metallic nanopowder includes particles having particle sizes between about 10 nm and 1000 nm or 1 μm and the nanopowder proppant particles are adapted to keep the metallic nanopowder particles separated and to form pores in a resulting anode. The processes also include pressing the mixture under pressing conditions of pressing time, pressing temperature, and pressing pressure to form a pressed shape. The processes further include heating the pressed shape in an inert gas environment under heating conditions of heating time, heating temperature, and heating pressure sufficient to sinter the mixture and to decompose the proppant or pore forming particles in the pressed shape to form a metal anode composition having a porous surface and a porous interior, where the porous surface comprises nanopores having a size between about 10 nm and about 1000 nm or 1 μm.

In certain embodiments, the processes further include a surface smoothing process designed to further expose and define the surface nanopores and/or reduce surface roughness or improve surface smoothness.

In certain embodiments, the surface smoothing process comprises a polishing step adapted to smooth one or both surfaces of the pressed shape to form a porous anode including a surface or surfaces having a smooth surface characterized by a surface roughness of less than or equal to about 100 mm. In other embodiments, the smooth surface characterized by a surface roughness of less than or equal to about 50 nm.

In certain embodiments, surface smoothing process comprises a polishing step adapted to smooth one or both surfaces of the pressed shape to form an porous anode including a surface or surfaces having a smooth surface characterized by a surface roughness of less than or equal to about 100 nm and ion etching step applied to the smoothed surface or surfaces to open surface nanopores that may have been closed or plugged during the polishing step.

In certain embodiments, the polishing step comprises mechanical polishing. In other embodiments, the polishing step comprises chemical polishing. In other embodiments, the polishing step comprises chemical-mechanical polishing (CMP).

In certain embodiments, the surface pores of the anodes have pore sizes between about 10 nm and about 500 nm or 0.5 μm, the interior pores have pore sizes between about 10 nm and about 10 μm and the surface has a roughness of less than or equal to about 100 nm. In other embodiments, the surface pores of the anodes have pore sizes between about 10 nm and about 500 nm or 0.5 μm, the interior pores have pore sizes between about 10 nm and about 10 μm and the surface has a roughness of less than or equal to about 50 nm.

In certain embodiments, the metallic nanopowder comprises particles having particle sizes between about 10 nm and 500 nm and the proppant nanopowder comprises particles having sizes between from 10 nm and 1000 nm or 1 μm. In other embodiments, the metallic nanopowder comprises particles having particle sizes between about 10 nm and 500 nm and the proppant nanopowder comprises particles having sizes between from 10 nm and 500 nm.

Anode Slabs

Embodiments of the present invention broadly relate to porous metal anode fabrication processes including mixing a metallic nanopowder and a proppant or pore forming nanopowder to form a nanopowder mixture, where the metallic nanopowder includes particles having particle sizes between about 10 nm and 1000 nm or 1 μm and the nanopowder proppant particles are adapted to keep the metallic nanopowder particles separated and to form pores in a resulting anode. The processes also include pressing the mixture under pressing conditions of pressing time, pressing temperature, and pressing pressure to form a pressed slab having at least one flat surface or portion thereof. The processes further include heating the pressed slab in an inert gas environment under heating conditions of heating time, heating temperature, and heating pressure sufficient to sinter the mixture and to decompose the proppant or pore forming particles in the pressed shape to form a sintered slab having a porous surface and a porous interior, where the porous surface comprises nanopores having a size between about 10 nm and about 1000 nm or 1 μm.

In certain embodiments, the processes further include cutting the sintered slab to form slices.

In certain embodiments, the slabs or thin slices may require further processing to yield a sufficiently smooth nanoporous surface so that the surface maybe uniformly and continuously coated by an electrolyte layer.

In certain embodiments, the processes further include a surface smoothing process designed to further expose and define the surface nanopores and/or reduce surface roughness or improve surface smoothness.

In certain embodiments, the surface smoothing process comprises a polishing step adapted to smooth one or both surfaces of the slab or slices to form a porous anode including a surface or surfaces having a smooth surface characterized by a surface roughness of less than or equal to about 100 nm. In other embodiments, the smooth surface or surfaces are characterized by a surface roughness of less than or equal to about 50 nm.

In certain embodiments, the surface smoothing process comprises a polishing step adapted to smooth one or both surfaces of the pressed shape to form an porous anode including a surface or surfaces having a smooth surface characterized by a surface roughness of less than or equal to about 100 nm and ion etching step applied to the smoothed surface or surfaces to open surface nanopores that may have been closed or plugged during the polishing step.

In certain embodiments, the polishing step comprises mechanical polishing. In other embodiments, the polishing step comprises chemical polishing. In other embodiments, the polishing step comprises chemical-mechanical polishing (CMP).

In certain embodiments, the sintered slab has a thickness greater than or equal to about 3 mm. In other embodiments, the sintered slab has a thickness greater than or equal to about 4 mm. In other embodiments, the sintered slab has a thickness greater than or equal to about 5 mm.

In certain embodiments, the slices have thicknesses between about 1 mm and about 1 μm. In other embodiments, the slices have thicknesses between about 500 μm and about 1 μm. In other embodiments, the slices have thicknesses between about 250 μm and about 1 μm. In other embodiments, the slices have thicknesses between about 100 μm and about 1 μm. In other embodiments, the slices have thicknesses between about 50 μm and about 1 μm.

The cutting step includes, but is not limited to, string saw cutting, diamond blade cutting, spark cutting, laser cutting, mechanical cutting, or combinations thereof.

Anode Constructs

Embodiments of the present invention broadly relates to porous metal anode construct fabrication processes including mixing a metallic nanopowder and a proppant or pore forming nanopowder to form a nanopowder mixture, where the metallic nanopowder includes particles having particle sizes between about 10 nm and 1000 nm or 1 μm and the nanopowder proppant particles are adapted to keep the metallic nanopowder particles separated and to form pores in a resulting anode. The processes also include pressing the mixture under pressing conditions of pressing time, pressing temperature, and pressing pressure to form a pressed shape. The processes further include heating the pressed shape in an inert gas environment under heating conditions of heating time, heating temperature, and heating pressure sufficient to sinter the mixture and to decompose the proppant or pore forming particles in the pressed shape to form a metal anode composition having a porous surface and a porous interior, where the porous surface comprises nanopores having a size between about 10 nm and about 1000 nm or 1 µm. The processes further include depositing a thin film oxide electrolyte of the nanoporous processed surface of the metal anode composition yielding a continuous, impermeable thin film electrolyte layer having no or substantially no gas leakage through the electrolyte layer and permitting no or substantially no shorting of the anode to a cathode through the electrolyte layer. Of course, the constructs may be formed from the slabs or slices as set forth above.

In certain embodiments, prior to the depositing step, the processes may further include a surface smoothing process designed to further expose and define the surface nanopores and/or reduce surface roughness or improve surface smoothness.

In certain embodiments, the surface smoothing process comprises a polishing step adapted to smooth one or both surfaces of the pressed shape, the slab, or the slices to form a porous anode including a surface or surfaces having a smooth surface characterized by a surface roughness of less than or equal to about 100 nm. In other embodiments, the smooth surface characterized by a surface roughness of less than or equal to about 50 nm.

In certain embodiments, surface smoothing process comprises a polishing step adapted to smooth one or both surfaces of the pressed shape, the slab, or the slices to form a porous anode including a surface or surfaces having a smooth surface characterized by a surface roughness of less than or equal to about 100 nm and ion etching step applied to the smoothed surface or surfaces to open surface nanopores that may have been closed or plugged during the polishing step.

In certain embodiments, the polishing step comprises mechanical polishing. In other embodiments, the polishing step comprises chemical polishing. In other embodiments, the polishing step comprises chemical-mechanical polishing (CMP).

SOFCs

Embodiments of the present invention broadly relates to SOFC and TFSOFC fabrication processes including mixing a metallic nanopowder and a proppant or pore forming nanopowder to form a nanopowder mixture, where the metallic nanopowder includes particles having particle sizes between about 10 nm and 1000 nm or 1 µm and the nanopowder proppant particles are adapted to keep the metallic nanopowder particles separated and to form pores in a resulting anode. The processes also include pressing the mixture under pressing conditions of pressing time, pressing temperature, and pressing pressure to form a pressed shape. The processes further include heating the pressed shape in an inert gas environment under heating conditions of heating time, heating temperature, and heating pressure sufficient to sinter the mixture and to decompose the proppant or pore forming particles in the pressed shape to form a metal anode composition having a porous surface and a porous interior, where the porous surface comprises nanopores having a size between about 10 nm and about 1000 nm or 1 µm. The processes further include depositing an electrolyte layer on a surface of the metal anode composition to form an anode construct, where the electrolyte layer is continuous and impermeable having no or substantially no gas leakage through the electrolyte layer and permitting no or substantially no shorting of the anode to a cathode through the electrolyte layer. The processes further include depositing a cathode on the electrolyte layer to form a SOFC of this invention. Of course, the constructs maybe formed from the slabs or slices described above and herein.

TFSOFCs

Embodiments of the present invention broadly relates to SOFC and TFSOFC fabrication processes including mixing a metallic nanopowder and a proppant or pore forming nanopowder to form a nanopowder mixture, where the metallic nanopowder includes particles having particle sizes between about 10 nm and 1000 nm or 1 µm and the nanopowder proppant particles are adapted to keep the metallic nanopowder particles separated and to form pores in a resulting anode. The processes also include pressing the mixture under pressing conditions of pressing time, pressing temperature, and pressing pressure to form a pressed shape. The processes further include heating the pressed shape in an inert gas environment under heating conditions of heating time, heating temperature, and heating pressure sufficient to sinter the mixture and to decompose the proppant or pore forming particles in the pressed shape to form a metal anode composition having a porous surface and a porous interior, where the porous surface comprises nanopores having a size between about 10 nm and about 1000 nm or 1 µm. The processes further include depositing a thin film of an oxide electrolyte of a surface of the metal anode to form a metal anode construct, where the thin film electrolyte layer is continuous and impermeable having no or substantially no gas leakage through the electrolyte layer and permitting no or substantially no shorting of the anode to a cathode through the electrolyte layer. The processes further include depositing a cathode on the electrolyte layer to form a SOFC of this invention. Of course, the constructs may be formed from the slabs or slices described above or herein. In certain embodiments, the electrolyte layer has a thickness of about 1 µm. In certain embodiments, the depositing steps comprise physical deposition, chemical vapor deposition, other thin film deposition processes, or mixtures and combinations thereof.

In certain embodiments, prior to the depositing step of the above SOFC and TFSOFC processes, the processes may further include a surface smoothing process designed to further expose and define the surface nanopores and/or reduce surface roughness or improve surface smoothness.

In certain embodiments, the surface smoothing process comprises a polishing step adapted to smooth one or both surfaces of the pressed shape, the slab, or the slices to form a porous anode including a surface or surfaces having a smooth surface characterized by a surface roughness of less than or equal to about 100 nm. In other embodiments, the smooth surface characterized by a surface roughness of less than or equal to about 50 nm.

In certain embodiments, surface smoothing process comprises a polishing step adapted to smooth one or both surfaces of the pressed shape, the slab, or the slices to form a porous anode including a surface or surfaces having a smooth surface characterized by a surface roughness of less than or equal to about 100 nm and ion etching step applied to the smoothed surface or surfaces to open surface nanopores that may have been closed or plugged during the polishing step.

In certain embodiments, the polishing step comprises mechanical polishing. In other embodiments, the polishing step comprises chemical polishing. In other embodiments, the polishing step comprises chemical-mechanical polishing (CMP).

Anodes, Anode Constructs, SOFCs, and TFSOFCs

Anode Precursor Compositions

Embodiments of this invention broadly relate to SOFC metal anode precursor compositions including a pressed shape comprising a nanopowder mixture including a metal nanopowder comprising particles having particle sizes between about 10 nm and 1000 nm or 1 µm and the proppant nanopowder comprising particles adapted to keep the metallic nanopowder particles separated.

Anodes

Embodiments of this invention broadly relate to SOFC porous anodes including a porous interior and a porous surface, where the surface and interior pores arise from decomposition of proppant or pore forming particles of an anode precursor composition including a pressed shape comprising a nanopowder mixture including a metal nanopowder comprising particles having particle sizes between about 10 nm and 1000 nm or 1 µm and the proppant nanopowder comprising particles adapted to keep the metallic nanopowder particles separated.

Anode Constructs

Embodiments of this invention broadly relate to solid oxide fuel cell (SOFC) porous anode constructs including an anode layer having a porous interior and a porous surface and an electrolyte layer formed on a surface of the anode layer, where the surface and interior pores arise from decomposition of proppant or pore forming particles of an anode precursor composition including a pressed shape comprising a nanopowder mixture including a metal nanopowder comprising particles having particle sizes between about 10 nm and 1000 nm or 1 µm and the proppant nanopowder comprising particles adapted to keep the metallic nanopowder particles separated and where the electrolyte layer is continuous and impermeable having no or substantially no gas leakage through the electrolyte layer and permitting no or substantially no shorting of the anode to a cathode through the electrolyte layer. In certain embodiments, the electrolytic layer is a continuous, dense, and electrically insulating thin film.

SOFCs

Embodiments of this invention broadly relate to SOFCs including a metal anode layer including a porous interior and a porous surface, an electrolyte layer formed on a surface of the metal, and a cathode layer formed on the electrolyte layer. The surface and interior pores arise from decomposition of proppant or pore forming particles of an anode precursor composition including a pressed shape comprising a nanopowder mixture including a metal nanopowder comprising particles having particle sizes between about 10 nm and 1000 nm or 1 µm and the proppant nanopowder comprising particles adapted to keep the metallic nanopowder particles separated. The electrolyte layer is continuous and impermeable having no or substantially no gas leakage through the electrolyte layer and permitting no or substantially no shorting of the anode to a cathode through the electrolyte layer. In certain embodiments, the electrolytic layer is a continuous, dense, and electrically insulating thin film.

TFSOFCs

Embodiments of this invention broadly relate to SOFCs including a metal anode layer including a porous interior and a porous surface, an electrolyte layer formed on a surface of the metal, and a cathode layer formed on the electrolyte layer. The surface and interior pores arise from decomposition of proppant or pore forming particles of an anode precursor composition including a pressed shape comprising a nanopowder mixture including a metal nanopowder comprising particles having particle sizes between about 10 nm and 1000 nm or 1 µm and the proppant nanopowder comprising particles adapted to keep the metallic nanopowder particles separated. The electrolyte layer is continuous and impermeable having no or substantially no gas leakage through the electrolyte layer and permitting no or substantially no shorting of the anode to a cathode through the electrolyte layer. In certain embodiments, the electrolytic layer is a continuous, dense, and electrically insulating thin film.

In certain embodiments of the above anodes, anode constructs, SOFCs, or TFSOFCs, the surface pores have pore sizes between about 10 nm and about 1000 nm, the interior pores have pore sizes between about 10 nm and about 10 microns, and the surface has a roughness of less than or equal to about 100 nm. In other embodiments, the surface pores have pore sizes between about 10 nm and about 500 nm, the interior pores have pore sizes between about 10 nm and about 10 microns, and the surface has a roughness of less than or equal to about 50 nm.

In certain embodiments, the metal anode comprises nickel, gold, platinum, or mixtures and combinations thereof. In other embodiments, the anode comprises nickel. In other embodiments, the anode comprises gold. In other embodiments, the anode comprises platinum.

In certain embodiments, the metal anode is comprised of a metallic component and a ceramic or nonmetallic component. In other embodiments, the metallic component comprises nickel, gold, platinum, or mixtures and combinations thereof and the ceramic or nonmetallic component comprise cermets, ceramic mixtures, or mixtures and combinations thereof. In other embodiments, the cermets and ceramics comprise metal oxides, metal borides, metal carbides, or mixtures and combinations thereof. In other embodiments, the cermet or ceramic is yttria stabilized zirconia (YSZ).

Suitable Reagents and Components of the Invention

Suitable metallic agents or metal containing materials for use in the invention include, without limitation, a nickel containing material, a gold containing material, a platinum containing material, a molybdenum containing material, a cobalt containing material, or mixtures and combinations thereof. Exemplary examples of metal containing materials include, without limitation, metals, metal-cermets, metal-ceramic mixtures, or mixtures and combinations thereof. Exemplary metals include, without limitation, nickel, cobalt, molybdenum, gold, platinum, or mixtures and combinations thereof. Exemplary examples of metal-cermets include, without limitation, nickel-cermets, molybdenum-cermets, cobalt-cermets, or mixtures thereof. Cermets are mixtures of the metals and ceramics. Exemplary examples of the ceramics include, without limitation, metal oxides, metal borides, metal carbides, or mixtures and combinations thereof. In certain embodiments, the metal oxides comprises yttria stabilized zirconia (YSZ). In certain embodiments, the metal-cermet comprises nickel-YSZ cermet.

Suitable proppants or pore forming agents for use in the invention include, without limitation, hydrogen peroxide, ammonium bicarbonate, ammonium hydroxide, organic peroxides, organic hydroperoxides, fused ring aromatics, ammonium carboxylates, or mixtures and combinations thereof. Exemplary organic peroxides include, without limitation, methyl ethyl ketone peroxide, methyl isobutyl ketone peroxide, benzoyl peroxide, acetyl benzoyl peroxide, di-(1-naphthoyl)peroxide, or mixtures and combinations thereof. Exemplary organic hydroperoxides include, without limitation, ethyl hydroperoxide, t-butyl hydroperoxide, or mixtures and combinations thereof. Exemplary fused ring aromatics include, naphthalene, anthracene, benzofuran, isobenzofuran, or mixtures and combinations thereof. Exemplary examples of ammonium carboxylates include, without limitation, ammonium formate, ammonium acetate, ammonium propionate, higher ammonium carboxylates, or mixtures and combinations thereof. Proppant powders that may be used in this processes of this invention include, without limitation, any nanopowder material that is non-reactive or substantially non-reactive with metals of the metallic agents and may be removed or decomposed at temperatures in a range between about 40° C. to about 400° C. Further, the addition of a catalyst may also be appropriate such as sugars or polyols including, without limitation, sucrose, fructose, glucose, sorbitol, or mixtures and combination thereof. The proppant removal may be via evaporation, sublimation, or any other physical process that cause some or all of the proppant to be removed from the mixture during subsequent processing.

Detailed Description of the Drawings

Anode Structure

Referring now to FIG. 1A, a metallic anode of this invention, generally 100, is shown to include macro-pores 102 in the bulk material 104 and nanopores 106 at its surface 108.

Figure 1B:
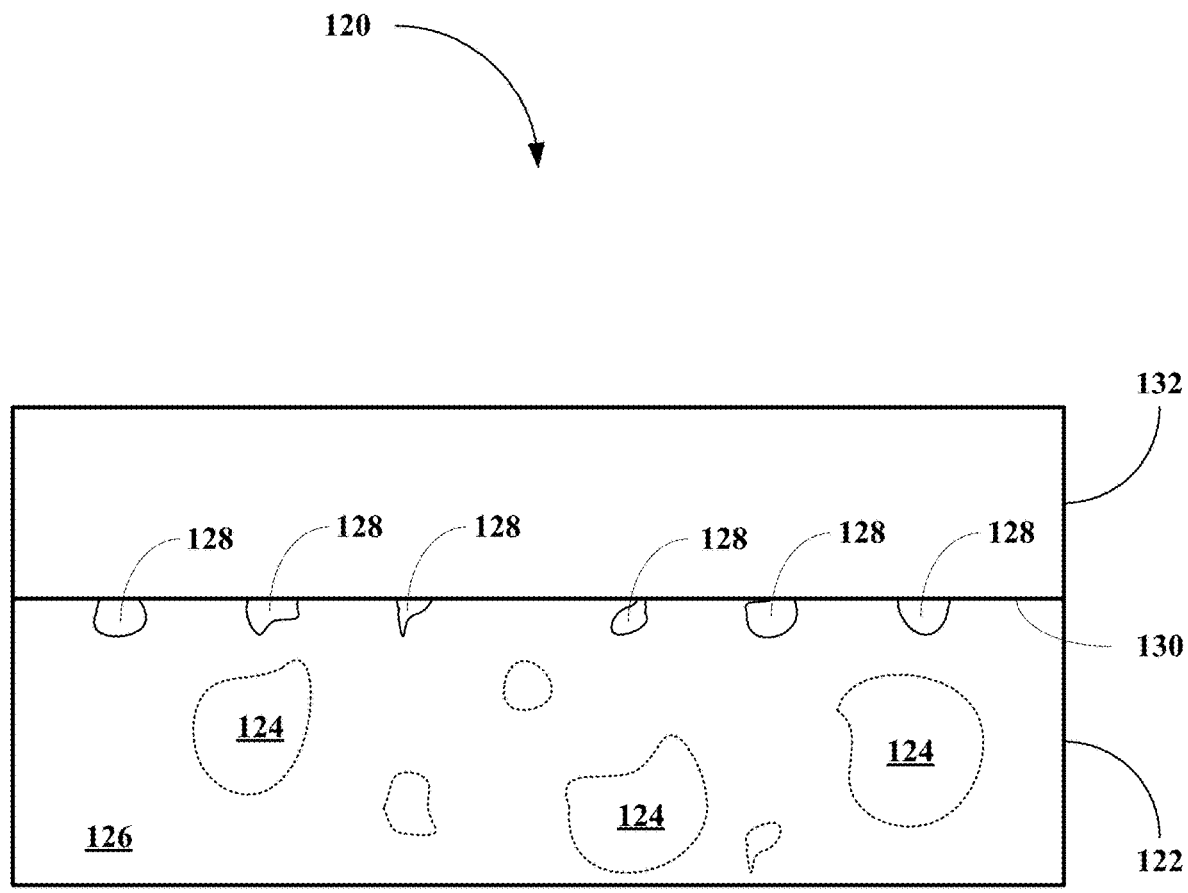
FIG. 1B depicts a schematic representation of a SOFC or TFSOFC of this invention.

Referring now to FIG. 1B, a metallic anode construct of this invention, generally 120, is shown to include a metallic anode layer 122 including macro-pores 124 in the bulk material 126 and nanopores 128 at its surface 130. The construct 120 also includes an electrolyte layer 132 deposited on the surface 130 of the anode layer 122.

Figure 1C:
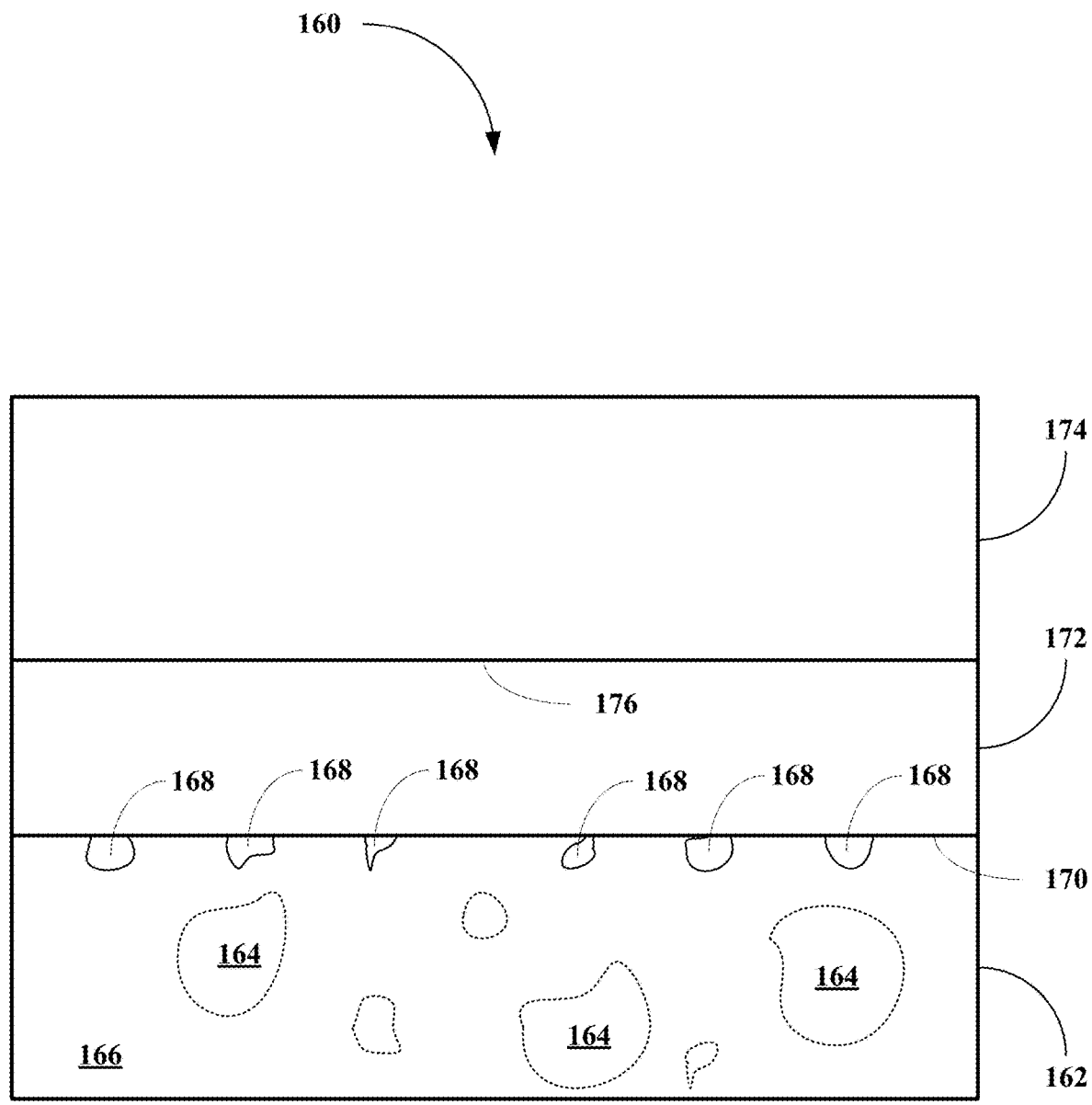
FIG. 1C depicts a schematic representation of a porous metal anode of this invention.

Referring now to FIG. 1C, an SOFC or TFSOFC of this invention, generally 160, is shown to include a metallic anode layer 162 including macro-pores 164 in the bulk material 166 and nanopores 168 at its surface 170. The SOFC or TFSOFC 160 also includes an electrolyte layer 172 deposited on the surface 170 of the anode layer 162. The SOFC or TFSOFC 160 also includes a cathode layer 174 deposited on a surface 176 of the electrolyte layer 172.

Methods for Making Anodes, Anode Constructs, SOFCs and TFSOFCs

Figure 2A:
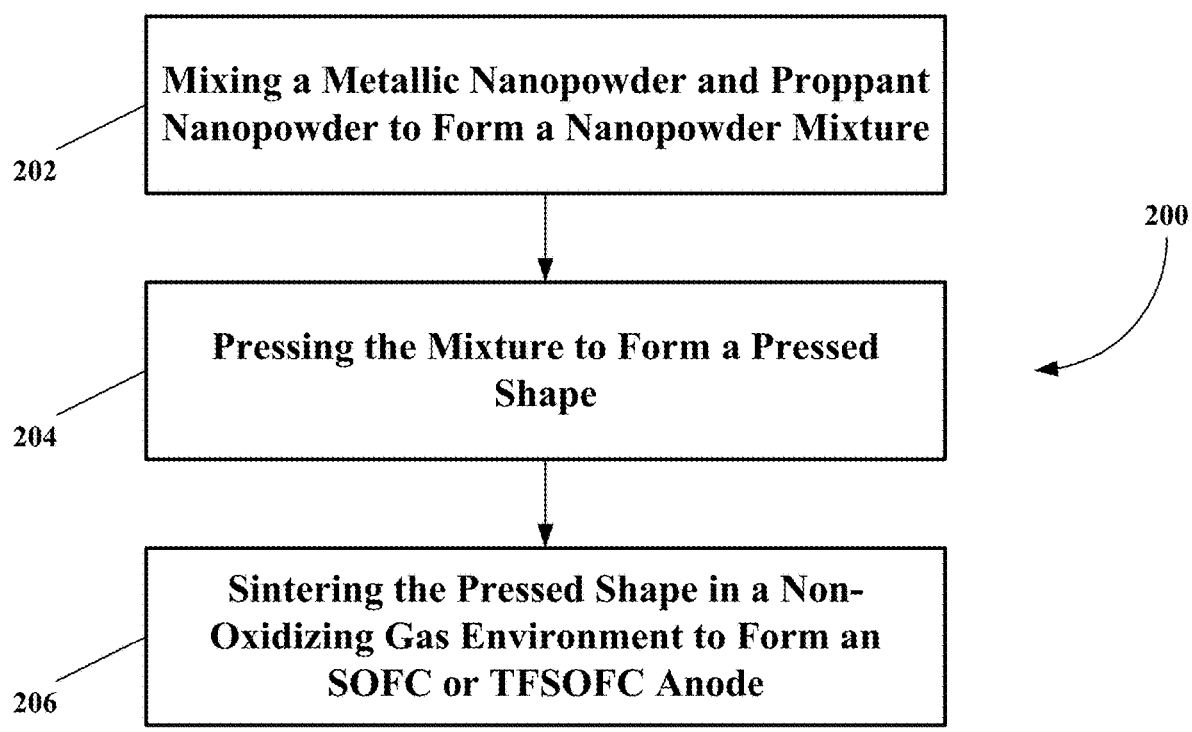
FIGS. 2A-C depict embodiments of a process flow diagram for fabrication of nanoporous metal anode of this invention.

Referring now to FIG. 2A, an embodiment of a flow diagram of a fabrication process for making porous metal anodes of this invention, generally 200, is shown to include a mixing step 202, where the mixing step 202 comprises mixing (a) a metallic or metal nanopowder or a plurality of metallic or metal nanopowders and (b) a proppant a pore forming agent nanopowder or a plurality of proppants or pore forming agent nanopowders to form a nanopowder mixture, where the metallic or metal particles having a particle size between about 10 nm and about 1000 nm (1 µm) and the proppants or pore forming particles having a particle size between about 10 nm and about 500 nm. The process 200 also includes a pressing step 204, where the pressing step 204 comprises pressing the nanopowder mixture under pressing conditions including a pressing time, a pressing temperature and a pressing pressure sufficient to form a pressed shape having a desired thickness. The process 200 also includes a sintering step 206, where the sintering step 206 comprises heating the pressed shape in an inert gas environment (e.g., a hydrogen gas environment) under heating conditions including a heat time, a heating temperature, and a heating pressure sufficient to sinter the metallic particles in the mixture and to decompose the proppant(s) or pore forming agent(s) to form an SOFC or TFSOFC anode.

Figure 2B:
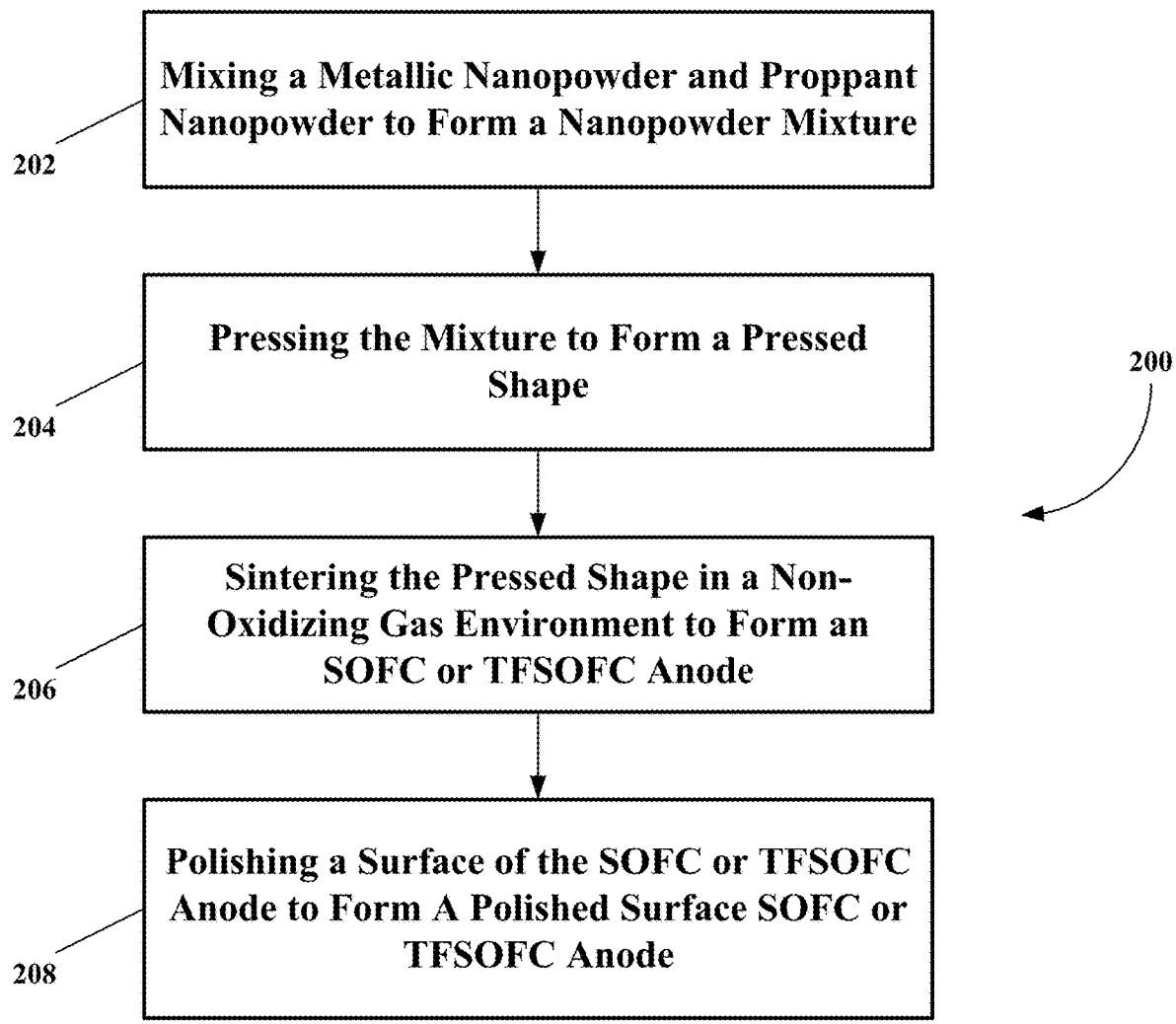

Referring now to FIG. 2B, another embodiment of the flow diagram of the fabrication process for making porous metal anodes 200 is shown to further include a polishing step 208, where the polishing step 208 comprises polishing a top surface or a top surface and bottom surface of the SOFC anode or an TFSOFC anode to form a smoothed surface SOFC or TFSOFC anode.

Figure 2C:
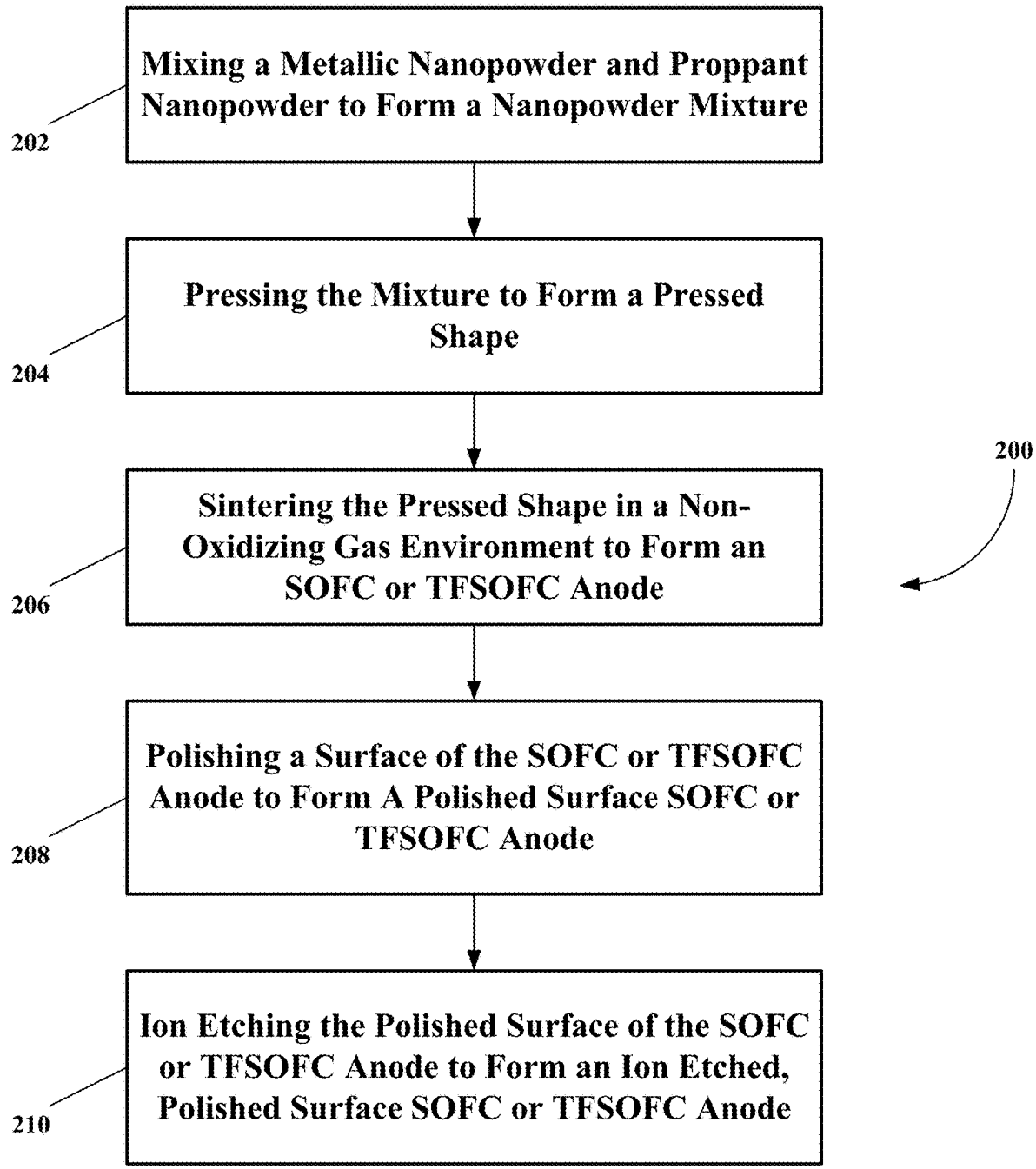

Referring now to FIG. 2C, another embodiment of the flow diagram of the fabrication process for making porous metal anodes 200 is shown to further include an etching step 210, where the etching step 210 comprises ion etching the smoothed surface or surfaces of the smoothed surface SOFC anode to form an ion etched, smoothed surface SOFC or TFSOFC anode.

Figure 3A:
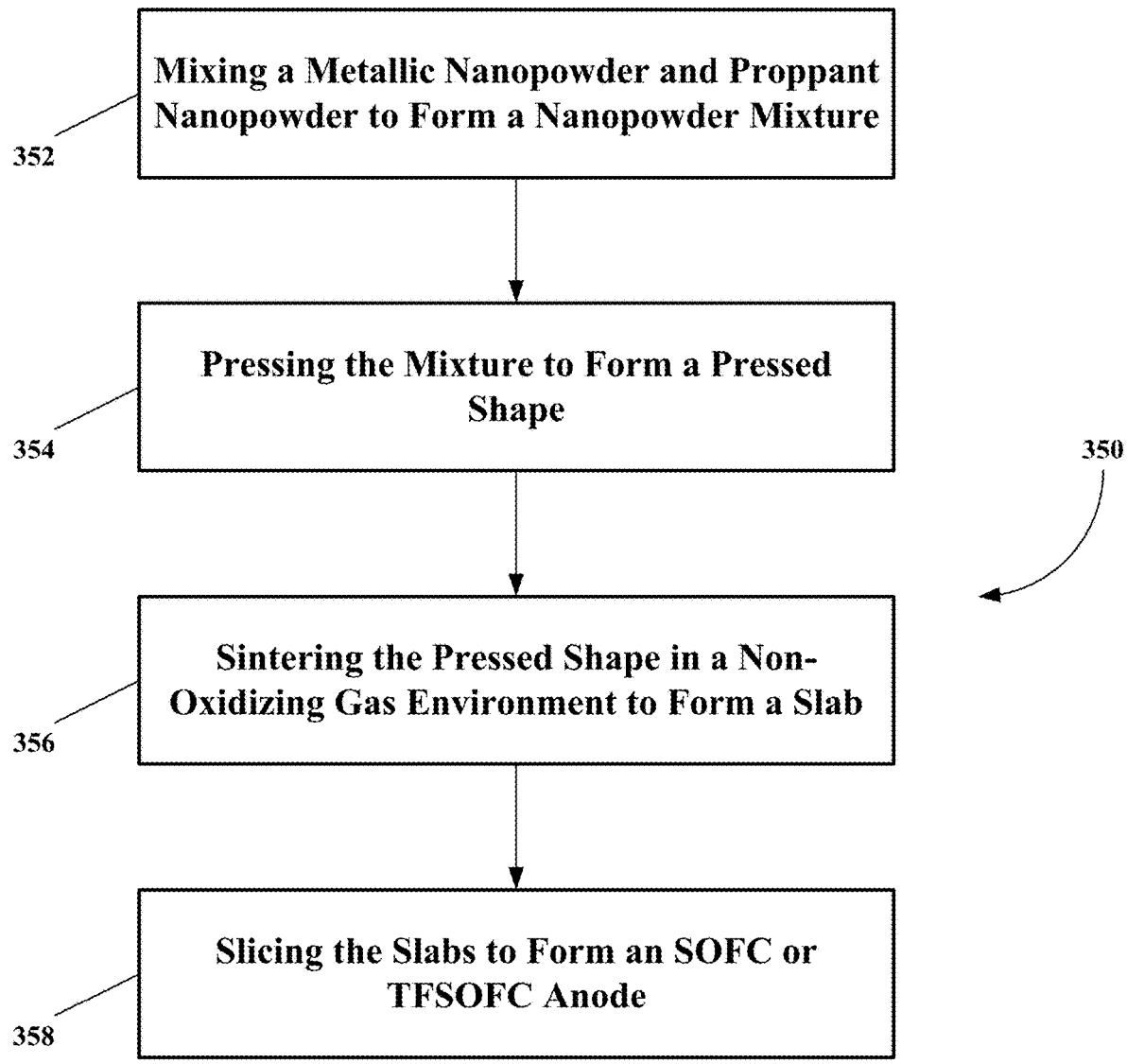
FIGS. 3A-C depict embodiments of another process flow diagram for fabrication of nanoporous metal anode of this invention.

Referring now to FIG. 3A, an embodiment of a flow diagram of another fabrication process for making porous metal anodes of this invention, generally 300, is shown to include a mixing step 302, where the mixing step 302 comprises mechanically mixing (a) a nanopowder metallic agent or a plurality of nanopowder metallic agents and (b) a nanopowder proppant or pore forming agent or a plurality of nanopowder proppants or pore forming agents to form a nanopowder mixture, where the nanopowder metallic agent or agents comprise particles having particle sizes between about 10 nm and about 500 nm and the nano proppant or proppants or pore forming agent or agents comprise particles having particle sizes between about 10 nm and about 500 nm. The process 300 also includes a pressing step 304, where the pressing step 304 comprises pressing the nanopowder mixture under pressing conditions including a pressing time, a pressing temperature and a pressing pressure sufficient to form a pressed shape having a desired thickness. The process 300 also includes a sintering step 306, where the sintering step 306 comprises heating the pressed shape in an inert gas environment (e.g., a hydrogen gas environment) under heating conditions including a heat time, a heating temperature, and a heating pressure sufficient to sinter the metallic particles in the mixture and to decompose the proppant(s) or pore forming agent(s) to form an SOFC or TFSOFC anode sufficient to sinter the metallic particles in the mixture and to decompose the pore forming agent(s) in the mixture to form an anode composition comprising a sintered slab. The process 300 also includes a slicing step 308, where the slicing step 308 comprise slicing the sintered slab into slices having a desired thickness.

Figure 3B:
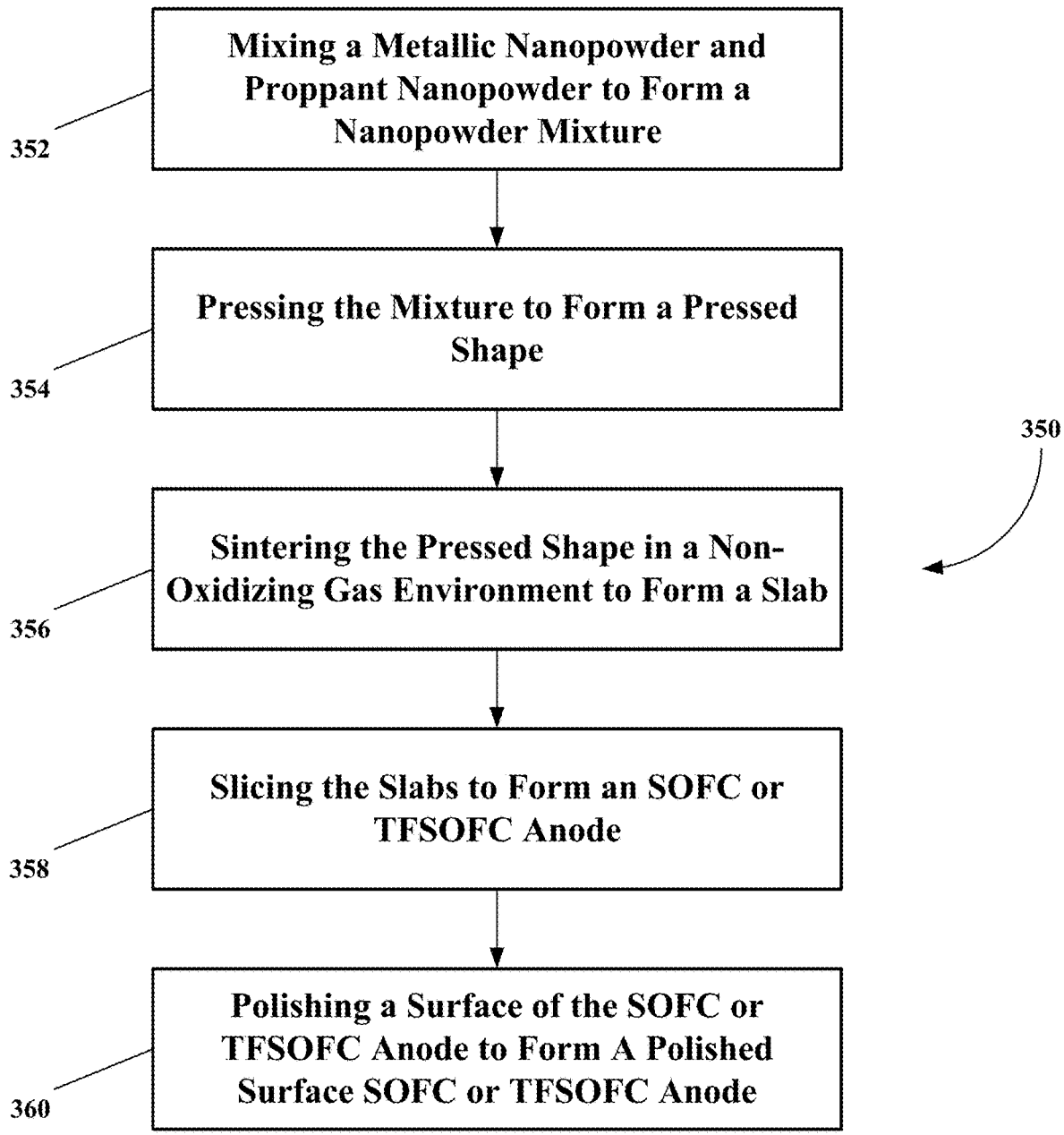

Referring now to FIG. 3B, another embodiment of the flow diagram of the fabrication process for making porous metal anodes 300 is shown to further include a polishing step 310 for polishing the slices, where the polishing step 310 comprises mechanically polishing a top surface or a top surface and a bottom surface of each slice to form an anode composition including at least one smoothed surface.

Figure 3C:
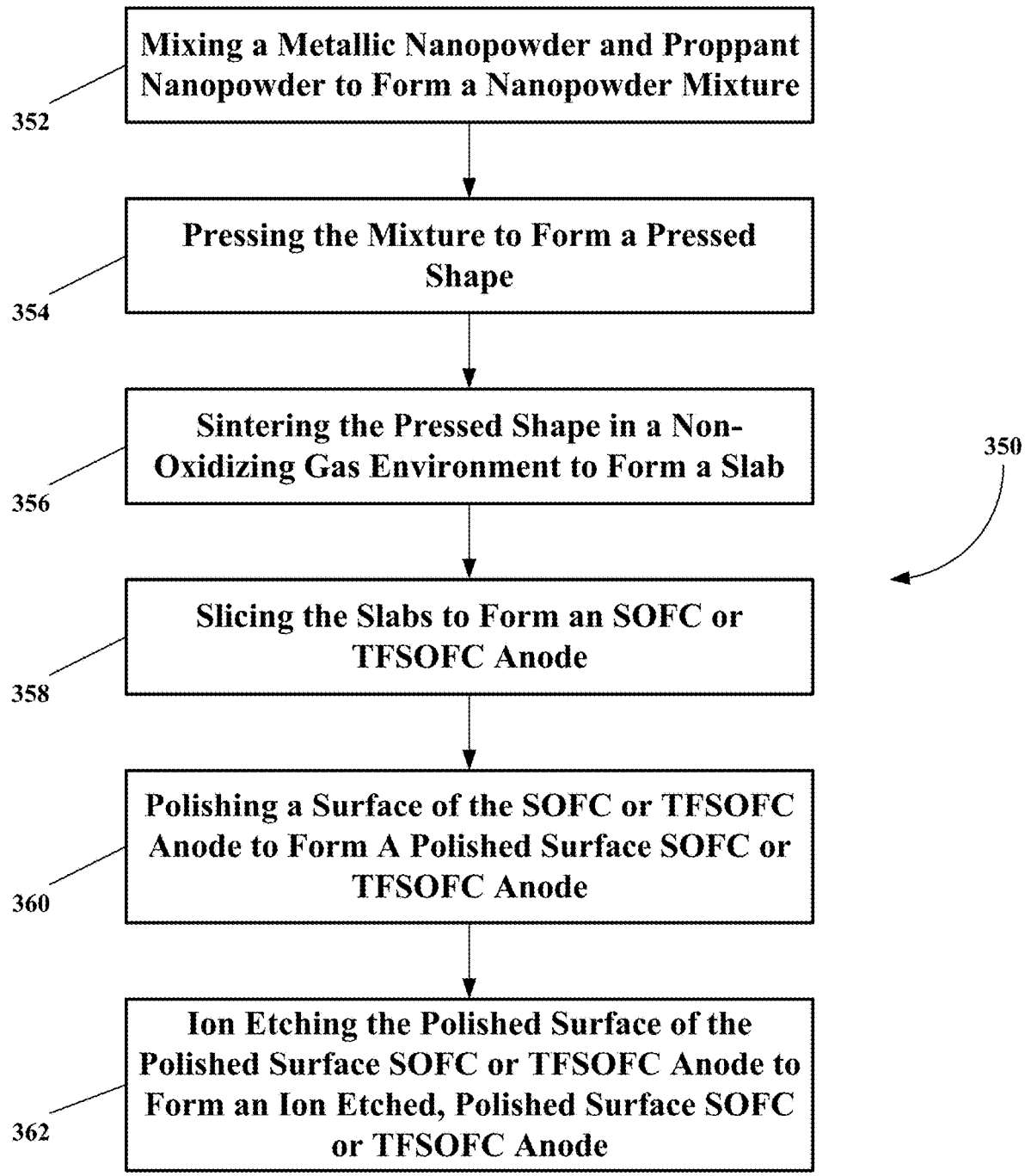

Referring now to FIG. 3C, another embodiment of the flow diagram of the fabrication process for making porous metal anodes 300 is shown to further include an etching step 312, where the etching step 312 comprises ion etching the smoothed surface or surfaces to form an anode composition including at least one ion etched and smoothed surface.

Experiments of the Invention

The porous metal anode is fabricated by mixing a metallic nanopowder e.g., nickel-cermet nanopowder and a proppant nanopowder to from a metal nanopowder/proppant nanopowder mixture. In certain embodiments, the mixing of the two components is thorough. The mixing may comprise a mechanical mixing procedure such as for example a ball milling procedure, a cyrogenic grinding procedure, or a mixture of these procedures. The mixture is then pressed in a press at a temperature and a pressure sufficient to form a shape such as a round disc, a square, or other desire shape, where the temperature ranges from room temperature or an elevated temperature and the pressure ranges between about 100 psi and about 10,000 psi. In certain embodiments, the pressure ranges between about 1,000 psi and about 10,000 psi. In other embodiments, the pressure ranges between about 5,000 psi and about 10,000 psi. In other embodiments, the pressure is about 10,000 psi. In certain embodiments, the elevated temperate is a moderate temperature between about 20° C. and about 100° C. In certain embodiments, a thickness of the shape is between about 10 cm and about 1 µm. In certain embodiments, the thickness is between about 1 mm and about 10 µm. In other embodiments, the thickness is between about 0.1 mm (100 µm) and about 10 µm. In certain embodiments, a die used for pressing the mixture includes parallel top and bottom sections so that the shape (e.g., disc) of the metal powder/proppant mixture has parallel or substantially parallel top and bottom surfaces. In other embodiments, the die faces are sufficiently smooth so that the shape has at least one smooth surface. In certain embodiments, each smooth surface characterized by having small surface pores and a high surface smoothness. Smooth surfaces are important for the formation or deposition of a continuous and dense electrolyte thin film layer on top of the surfaces of the shape to form an anode composition of this invention including an anode layer covered with a dense electrolyte layer.

After the metal powder/proppant mixture is pressed into a shape, the shape is loaded into a furnace. In certain embodiments, the furnace is a controlled temperature and atmosphere furnace such as a tube furnace. The shape may be supported inside of the furnace so that at least one side of the shape is uncovered. In certain embodiments, a temperature of the furnace comprises an elevated temperature. In other embodiments, the elevated temperature in the oven/furnace is uniform or substantially uniform (within ±5° C.) so that the shape is uniformly or substantially uniformly heated achieving a uniform or substantially uniform temperature throughout the shape. A flow of non-oxidizing gas is maintained around the sample during heating at the elevated temperature. The gas environment comprises an inert gas, hydrogen gas, a hydrogen-inert gas mixture, nitrogen gas, or any other gas or gas mixture that is non-oxidizing to the metal component of the shape. In certain embodiments, the environment comprises a vacuum environment having a desired reduced pressure or vacuum level for non-oxidation of the metal component of the shape during the heating process. In other embodiments, the heating occurs for a time sufficient to sinter the mixture of the shape to form a sintered shape. In certain embodiments, a gas flow through the furnace may be controlled to be from a few standard cubic centimeters per minute (sccm) to several hundred sccm or between about 1 sccm to about 500 sccm. In other embodiments, the gas flow is between about 1 sccm and about 300 sccm. In other embodiments, the gas flow is between about 1 sccm and about 200 sccm. In other embodiments, the gas flow is between about 1 sccm and about 100 sccm. The shaped sample is heated in the furnace with an appropriate non-oxidizing atmosphere. In certain embodiments, the heating process starts at room temperature and is ramped up at a heating rate between about 1° C. and about 20° C. per minute up to an elevated temperature. In certain embodiments, the elevated temperature is between about 100° C. and about 1000° C. In other embodiments, the elevated temperature is between about 500° C. and about 1000° C. In certain embodiments, the heating is continued for a period ranging between about 30 minutes and about ten hours under the controlled gas flow rate of the non-oxidizing gas. During the heating time, the shaped sample may shrink in size. After heating for the desired time and temperature, the shaped sample is cooled at a cooling rate between about 1° C. and about 30° C. per minute to room temperature.

Figure 4A:
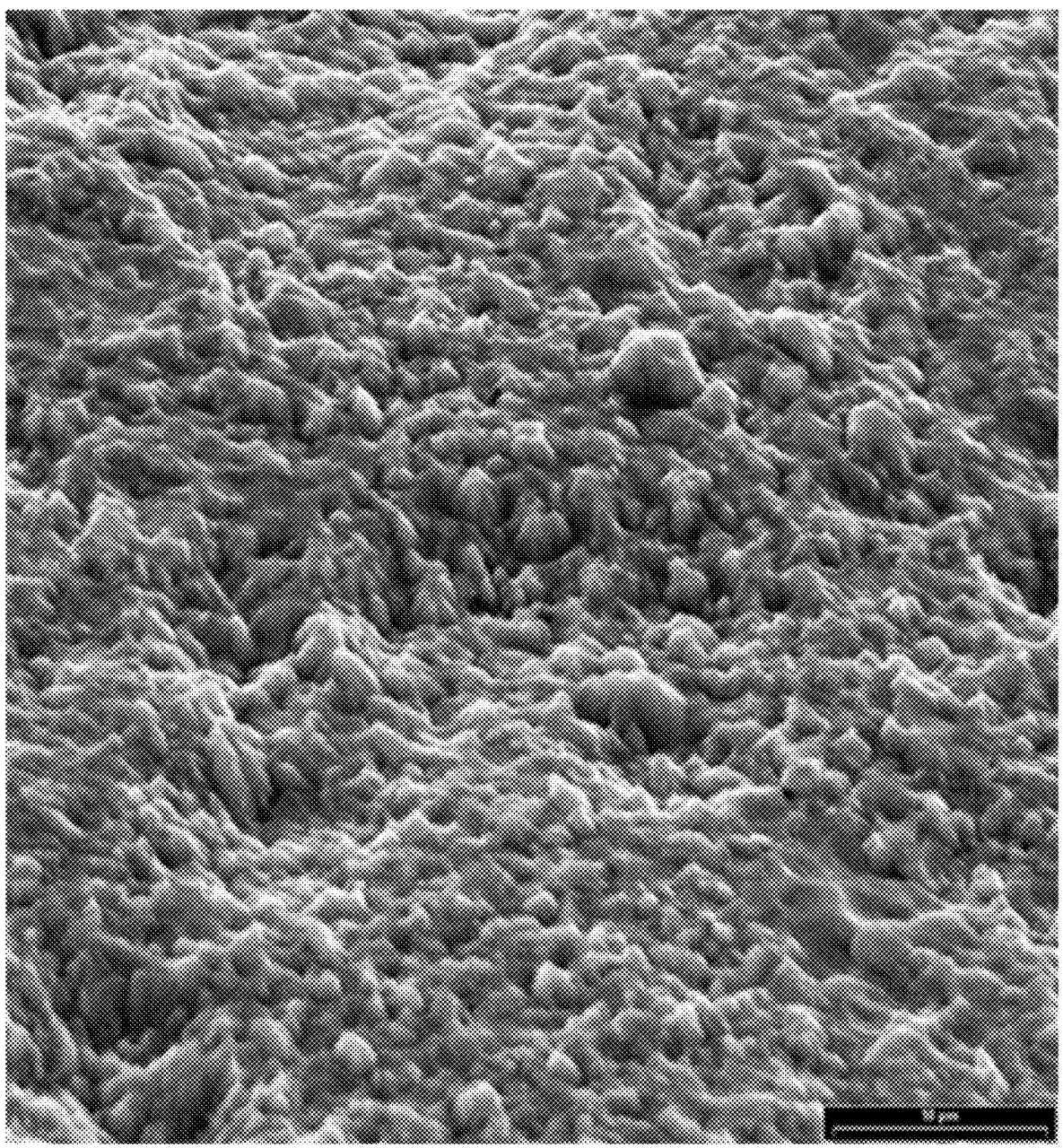
FIGS. 4A-C depict scanning electron micrographs of the surface of the porous metal anode: (A) after high temperature processing, but not in the finished state; (B) after mechanical polishing of the sample (A); (C) after ion etching of sample (B) process complete.
Figure 4B:
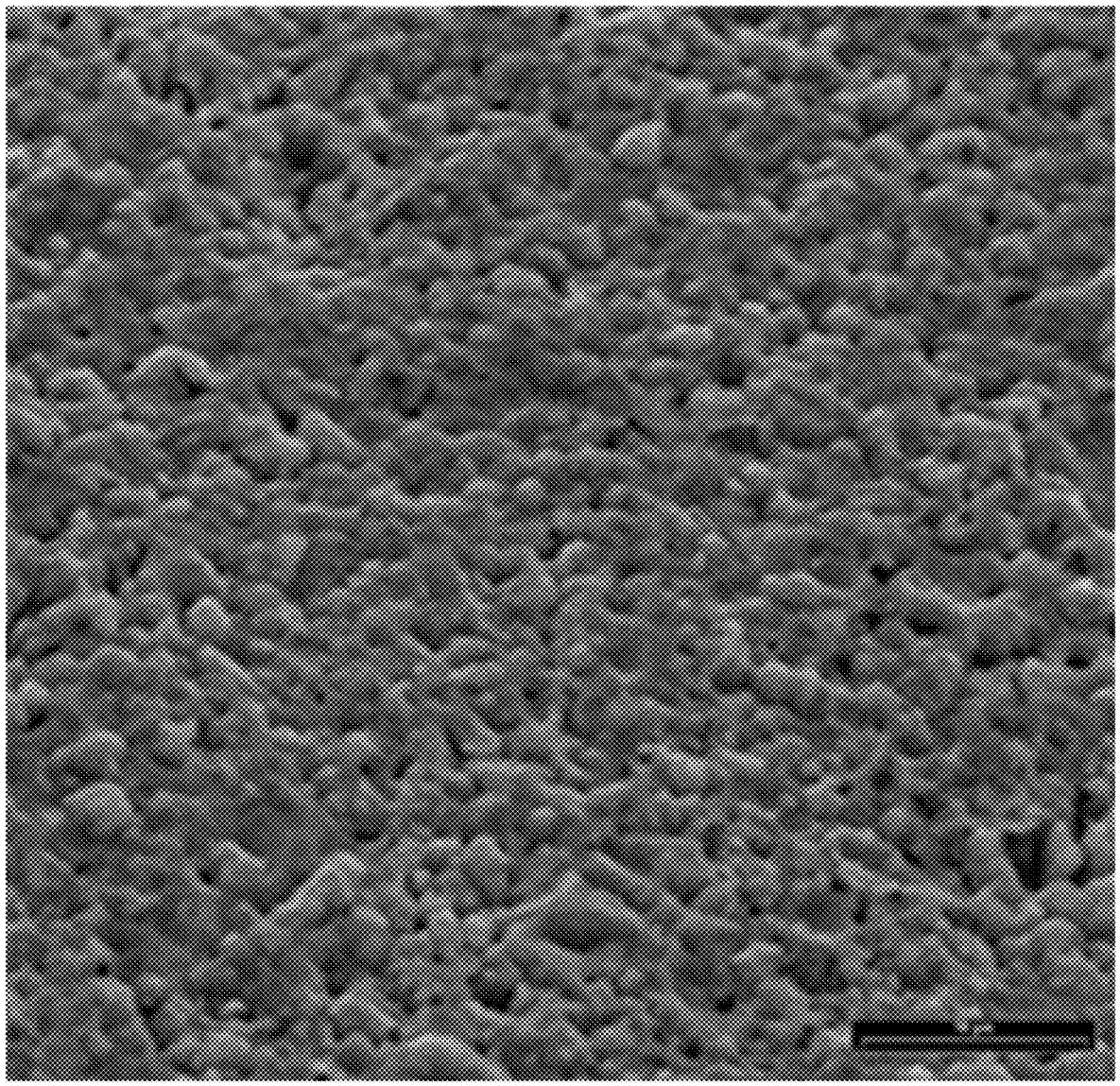
Figure 4C:
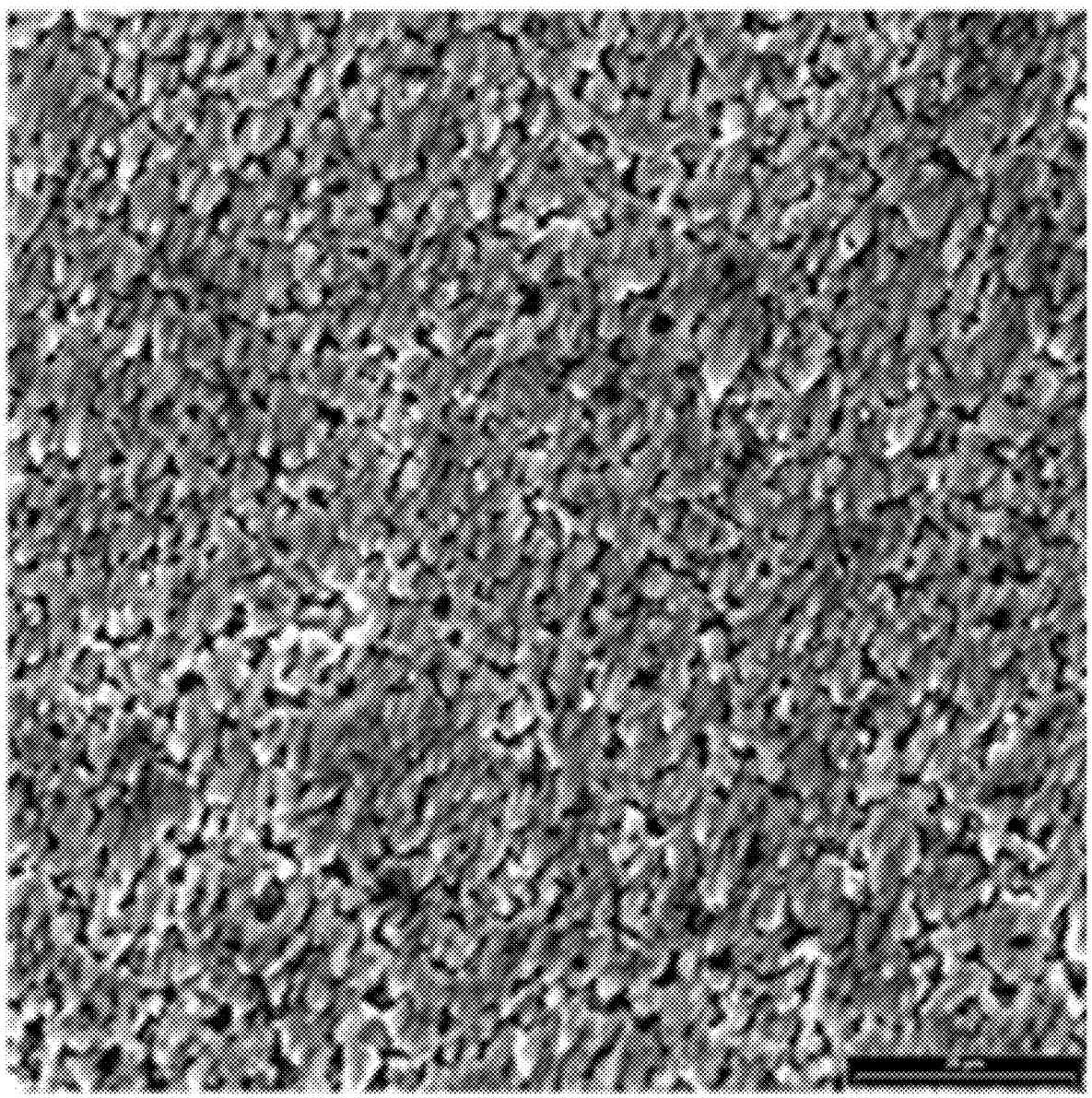

After pressing and sintering, surfaces of either the a processed thin anode sample, or a thin sliced slab from a thick processed sample is nominally microscopically rough, although with pores of the appropriate few hundred nm in size as shown in FIG. 4A. Such a surface, although it has the appropriate pore structure, is much too rough to be effectively uniformly and continuously coated with a thin film electrolyte layer. Hence, an additional processing step may be required to smooth one or both of the porous surfaces of the disc and still maintain nano-porosity. This additional step may be achieved as example by mechanically polishing the porous metal disc surface(s) using a number of different polishing pastes, which may include both different composition polishing pastes as well as different particle size polishing pastes. These pastes may include diamond paste, aluminum oxide paste, silicon carbide paste, tungsten carbide paste, any number of other polishing paste compositions of the above or other hard materials or mixtures and combinations thereof. The particle size of the hard materials in the polishing pastes may vary from as large as from about 50µ to about 100 nm. In certain embodiments, the particle size is from about 10µ to about 100 nm. The porous metal disc is polished smooth to a roughness is less than or equal to about 50 nm as shown FIG. 4B. In other embodiments, the roughness of the polished smooth surface is less than or equal to about 40 nm. In other embodiments, the roughness of the polished smooth surface is less than or equal to about 30 nm. Chemical polishing or chemical mechanical polishing (CMP) may also be used to smooth the surface of the porous metal disc with monitoring the process to minimize etching and enlargement of the surface pores. Such polishing steps, especially mechanical polishing, may leave the surface pores somewhat closed due to metal fold-over into the surface pores. This effect can be mitigated by a final process step that will open the surface pores. Sonication may be used to remove the any polishing powder residue on/in the disc surface. The surface can then be chemically etched by appropriate acid etching for smoothing, or mechanical removal of material by inert gas ion bombardment can be applied to the porous nickel metal sample to open surface nanopores. The ion bombardment or ion etching is best done at an oblique angle to the surface which allows for more effective opening of closed pores and yet retains a relatively smooth surface. Nominal ion etch conditions include ion currents of from 5 mA/cm$^2$ to 50 mA/cm$^2$ at bias voltages of from 300 V to up to 1500 V. After ion etching, the finished product porous metal anode with nanoporous surface structure is shown in FIG. 4C.

Figure 5:
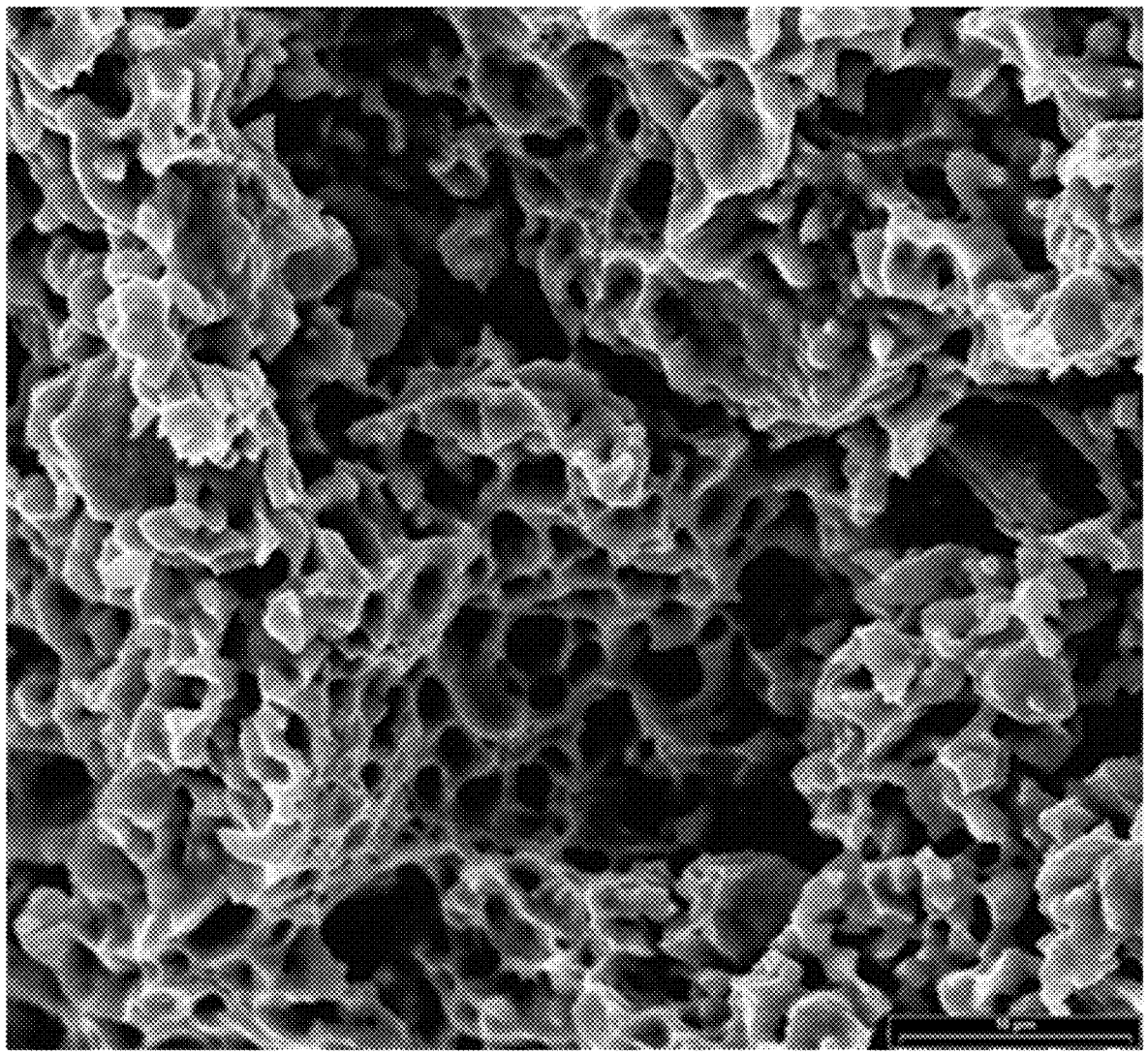
FIG. 5 depicts a scanning electron micrograph of the interior of the porous metal anode showing larger pores in the interior than at the surface (FIG. 4C).
Figure 6:
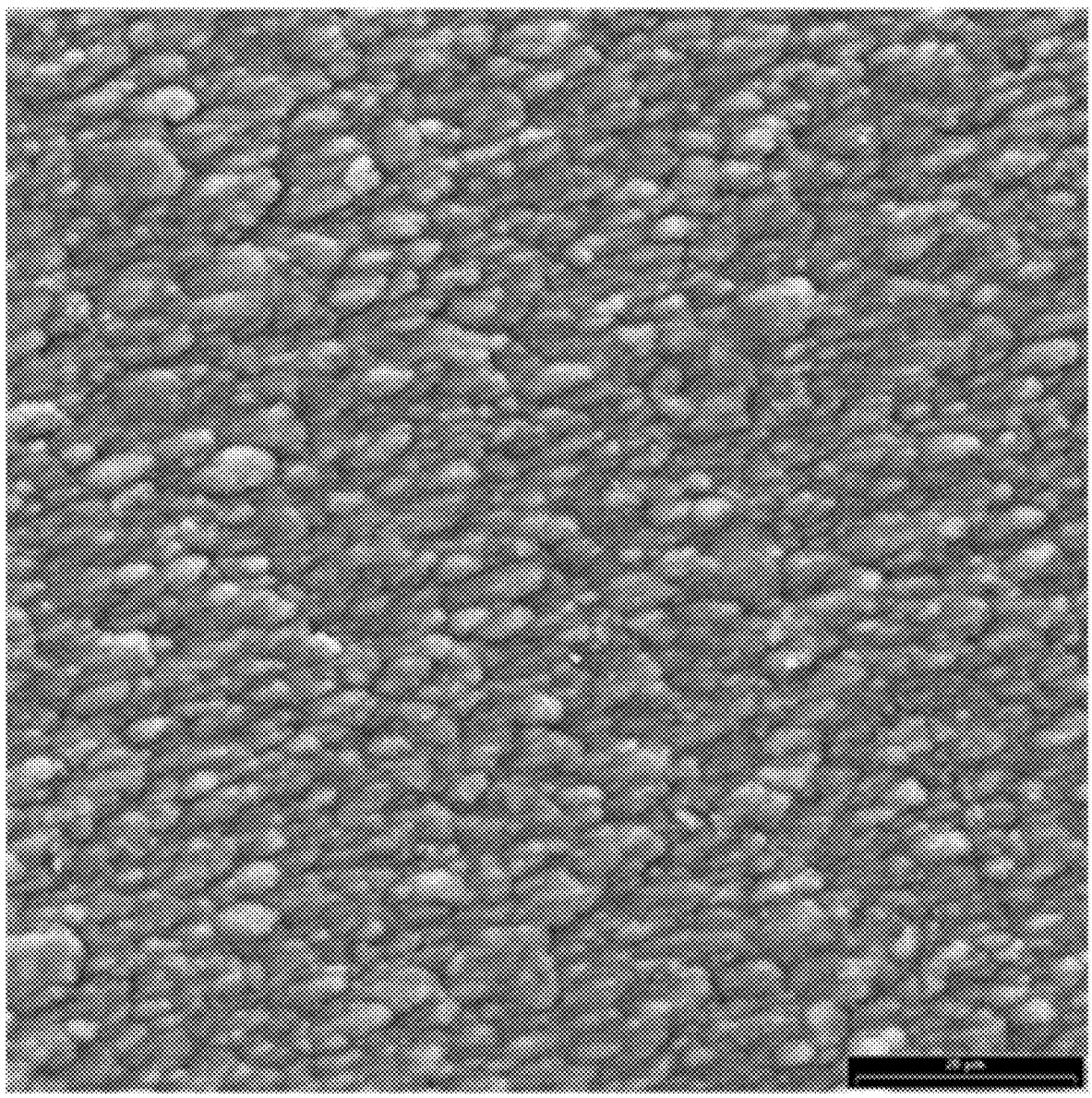
FIG. 6 depicts a scanning electron micrograph showing a dense and continuous electrolyte layer deposited on top of the nanoporous surface of the processed metal anode.

After ion etching or other surface nanopore opening process, the interior of the porous metal anode still retains large pores as shown in FIG. 5, which better accommodate good gas flow though the anode. A porous metal anode with appropriate surface nanoporosity will allow for the deposition of a continuous and dense thin film electrolyte on the anode. This deposition of an electrolyte film of from 0.1 micron to 5 micron thickness can be accomplished by any number of physical or chemical vapor deposition processes including direct chemical deposition processes such as sol gel deposition. An example of a yttria stabilized zirconia (YSZ) film deposited by metal organic chemical vapor deposition (MOCVD) onto a complete processed porous nickel anode with nanoporous surface structure is shown in FIG. 6. The complete coating of the porous metal surface with the YSZ layer should be noted along with the absence of any porosity in YSZ layer. The foregoing disclosure and description are illustrative and explanatory thereof, and various changes in the details of the method and apparatus can be made without departing from the spirit of the invention.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A solid oxide fuel cell (SOFC) porous anode comprising:
   a porous interior including interior pores having interior pore sizes, and
   a porous surface including surface pores having surface pore sizes,
   wherein the anode is formed from sintered metal-containing nano-particles and
   wherein at least some of the interior pores have sizes greater than the surface pore sizes;
   wherein:
      the surface pore sizes range between about 310 nm and about 1000 nm, and/or
      the interior pore sizes range between about 10 nm and about 1 micron, and/or
      the porous surface has a roughness of less than or equal to about 100 nm or the roughness of less than 50 nm.

2. The anode of claim 1, wherein:
   the metal containing nano-particles comprises metal nano-particles, metal-cermet nanoparticles, a mixture of metal nano-particles and ceramic nano-particles, or mixtures and combinations thereof.

3. The composition of claim 2, wherein the metal-cermet nanoparticles and the ceramic nano-particles comprise metal oxides nano-particles, metal borides nano-particles, metal carbides nano-particles, or mixtures and combinations thereof.

4. The composition of claim 3, wherein the metal-cermet nano-particles and the ceramic nano-particles comprise yttria stabilized zirconia (YSZ) nano-particles.

5. The anode of claim 3, wherein:
   the metal of the metal-containing nano-particles is selected from the group consisting of nickel, cobalt, molybdenum, gold, platinum, and mixtures thereof,
   the metal-cermet nano-particles are selected from the group consisting of nickel-cermet nano-particles, molybdenum-cermet nano-particles, cobalt-cermet nano-particles, and mixtures thereof,
   the ceramic nano-particles are selected from the group consisting of metal oxide nano-particles, metal boride nano-particles, metal carbide nano-particles, and mixtures thereof, and the metal of the ceramic nano-particles are selected from the group consisting of nickel, cobalt, molybdenum, gold, platinum, and mixtures thereof.

6. The anode of claim 2, wherein:
   the metal in the elemental metal portion of the metal-containing nano-particles is selected from the group consisting of nickel, cobalt, molybdenum, gold, platinum, and mixtures thereof.

7. The anode of claim 2, wherein:
   the metal-cermet nano-particles are selected from the group consisting of nickel-cermet nano-particles, molybdenum-cermet nano-particles, cobalt-cermet nano-particles, and mixtures thereof.

8. The anode of claim 2, wherein:
   the ceramic nano-particles are selected from the group consisting of metal oxide nano-particles, metal boride nano-particles, metal carbide nano-particles, and mixtures thereof, and
   the metal of the ceramic nano-particles are selected from the group consisting of nickel, cobalt, molybdenum, gold, platinum, and mixtures thereof.

9. The anode of claim 1, wherein the anode is formed by sintering a composition
   including one or more metallic powders and one or more pore forming agents under sintering conditions that decompose the pore forming agents.

10. The anode of claim 9, wherein the pore forming agents are selected from the group consisting of hydrogen peroxide, ammonium bicarbonate, ammonium hydroxide, organic peroxides, organic hydroperoxides, fused ring aromatics, ammonium carboxylates, and mixtures thereof.

11. The anode of claim 10, wherein the organic peroxides are selected from the group consisting of methyl ethyl ketone peroxide, methyl isobutyl ketone peroxide, benzoyl peroxide, acetyl benzoyl peroxide, di-(1-naphthoyl)peroxide, or mixtures and combinations thereof.

12. The anode of claim 10, wherein the fused ring aromatics include, naphthalene, anthracene, benzofuran, isobenzofuran, and mixtures thereof.

13. The anode of claim 10, wherein the ammonium carboxylates are selected from the group consisting of ammonium formate, ammonium acetate, ammonium propionate, higher ammonium carboxylates, and mixtures thereof.

14. A solid oxide fuel cell (SOFC) porous anode construct comprising:
   a metal anode layer formed from sintered metal-containing nanoparticles including a porous interior including interior pores having interior pore sizes and a porous surface including surface pores having surface pore sizes, and
   an electrolytic layer formed on the porous surface,
   wherein the electrolytic layer is a continuous, dense, and electrically insulating thin film,
   wherein:
      the surface pore sizes range between about 310 nm and about 1000 nm, and/or
      the interior pore sizes range between about 10 nm and about 1 micron, and/or
      the porous surface has a roughness of less than or equal to about 100 nm or the roughness of less than 50 nm.

15. The construct of claim 14, wherein:
   the metal of the metal anode comprises nickel, gold, platinum, or mixtures and combinations thereof or the anode is comprised of a metallic component and a ceramic or nonmetallic component.

16. The construct of claim 15, wherein:
   the metal comprises a metal, a metal-cermet, a metal-ceramic mixture, or mixtures and combinations thereof, wherein the metal is selected from the group consisting of nickel, cobalt, molybdenum, gold, platinum, and mixtures thereof, wherein the metal-cermet is selected from the group consisting of nickel-cermets, molybdenum-cermets, cobalt-cermets, and mixtures thereof, wherein the ceramic is selected from the group consisting of metal oxides, metal borides, metal carbides, and mixtures thereof.

17. The construct of claim 16, wherein the cermets and ceramics comprise metal oxides, metal borides, metal carbides, or mixtures and combinations thereof.

18. The construct of claim 17, wherein the cermet or ceramic is yttria stabilized zirconia (YSZ).

19. A solid oxide fuel cell (SOFC) electrical construct comprising:
a metal anode layer including a porous interior including interior pores having interior pore sizes and a porous surface including surface pores having surface pore sizes,
an electrolytic layer formed on the porous surface, and
a metal cathode layer formed on the electrolytic layer,
where the electrolytic layer is a continuous, dense, and electrically insulating thin film eliminating shorting and eliminating gas flow through the construct, wherein:
the surface pore sizes range between about 310 nm and about 1000 nm, and/or
the interior pore sizes range between about 10 nm and about 1 micron, and/or
porous surface has a roughness of less than or equal to about 100 nm or the roughness of less than 50 nm.

20. The construct of claim 19, wherein:
the metal of the metal anode comprises nickel, gold, platinum, or mixtures and combinations
thereof or the anode is comprised of a metallic component and a ceramic or nonmetallic component.

21. The construct of claim 20, wherein the metal comprises nickel, gold or platinum or the metallic component comprises nickel, gold, platinum, or mixtures and combinations thereof and the ceramic or nonmetallic component comprise cermets, ceramic mixtures, or mixtures and combinations thereof.

22. The composition construct of claim 21, wherein the cermets and ceramic mixtures comprise metal oxides, metal borides, metal carbides, or mixtures and combinations thereof.

23. The construct of claim 22, wherein the cermet or ceramic is yttria stabilized zirconia (YSZ).

* * * * *